United States Patent [19]

Golze

[11] 4,239,253
[45] Dec. 16, 1980

[54] BODY EXTENDER

[76] Inventor: Richard R. Golze, 637 Kingsley Trail, Bloomfield Hills, Mich. 15090

[21] Appl. No.: 898,976

[22] Filed: Apr. 21, 1978

[51] Int. Cl.³ .................... B62D 63/06; B60D 1/00
[52] U.S. Cl. .................... 280/460 R; 224/42.04; 280/501; 280/769; 293/117; 296/37.1; 296/181
[58] Field of Search ............. 280/460 R, 500, 501, 280/505, 656, 789, 783, 769, 81 R, 720; 296/35 A, 23 MC, 181, 37.1; 224/42.03 A, 42.04, 42.05, 42.07; 293/117

[56] References Cited

U.S. PATENT DOCUMENTS

| | | | |
|---|---|---|---|
| 1,401,786 | 12/1921 | Kapferer | 280/460 R |
| 1,770,309 | 7/1930 | Hoffman | 224/42.05 |
| 2,596,655 | 5/1952 | Converse | 280/718 |
| 2,699,735 | 1/1955 | Williams | 296/35 A |
| 2,953,392 | 9/1960 | Haley | 280/718 |
| 3,202,332 | 8/1965 | Walker | 224/42.03 A |
| 3,294,420 | 12/1966 | Martin | 280/460 R |
| 3,547,469 | 12/1970 | Sancioni | 293/117 |
| 3,752,496 | 8/1973 | Meinecke | 280/81 R |
| 3,784,230 | 1/1974 | Worrall, Jr. | 280/789 |
| 3,922,002 | 11/1975 | Lindbert et al. | 293/117 |

*Primary Examiner*—David M. Mitchell

[57] ABSTRACT

A vehicle body extender having a frame, at least one housing supported by the frame, the frame resiliently attached to an axle by a spring, wheels rotatably mounted at each end of the axle, the frame comprising of at least two frame members longitudinally extending towards the vehicle to which the extender is to be coupled, a connecting device to rigidly connect the longitudinally extending frame member to the vehicle.

7 Claims, 6 Drawing Figures

BODY EXTENDER

BACKGROUND OF THE INVENTION

This invention relates to towed vehicles, and more particularly to towed vehicles which extend the body of the towing vehicle.

The energy crisis has been the cause of dramatic changes in many aspects of transportation, including the automobile. Significant changes in motor design and styling have been recently introduced by the major automobile manufacturing companies, all with the view to increasing the efficiency of the automobile. One of the most dramatic and radical programs being undertaken by these companies is the "scale down" program under which the automobile manufacturing companies are systematically reducing the overall size of each of their model lines. This reduction in vehicle size has touched every aspect of the automobile, including the trunk area. The trade-off between passenger space and trunk space reductions is usually struck in favor of reducing trunk space rather than passenger space.

Accordingly, the newer smaller model automobiles have only very limited trunk space, both in terms of total volume, and in terms of trunk breadth and depth. This has all resulted in a pressing need for selectively extending the body of the automobile when luggage requirements exceed the trunk capacity.

A vehicle body extender is more than a typical trailer for it not only enlarges the carrying capacity of the automobile, but also is integrated with that vehicle from both a structural and performance point of view. With respect to the former, the vehicle body extender must be integrated with the energy absorption system, operatively associated with the rear bumper of the automobile with which it is coupled. This is important in that impacts to the rear of the extender must be effectively transfered to that absorption system. With respect to the latter, the vehicle body extender must steer with the automobile to which it is attached in both forward and reverse directions. This is also very important for many people have great difficulty in backing up an automobile with an articulated trailer attached, and this difficulty has resulted in many serious accidents.

In addition to the above characteristics, the vehicle body extender must also be capable of being efficiently and quickly coupled with the towing automobile. This must be accomplished without any sacrifice in the integrity of the union. Additionally, the vehicle body, once coupled to the automobile, must not be overloaded, thereby having an adverse effect on the braking and steerability of the combination vehicle-extender.

SUMMARY OF THE INVENTION

It is a primary object of the present invention to provide a vehicle body extender comprising a frame, at least one housing supported by said frame, said frame resiliently attached to an axle by spring means, wheels rotatably mounted at each end of said axle, said frame comprising at least two frame members longitudinally extending toward the vehicle to which the said extender is to be coupled, connecting means to rigidly connect said longitudinally extending frame members to said vehicle.

It is another object of the present invention to provide a vehicle body extender wherein the said longitudinally extending frame members are each provided with a pivotal connection to permit said extender and said vehicle to move vertically with respect to each other.

It is yet another object of the present invention to provide a vehicle body extender wherein there are two longitudinally extending frame members, said vehicle being provided with a rear bumper means attached to the frame of said vehicle by energy absorption means, said bumper means receiving each said frame members for rigid connection thereto.

It is yet another object of the present invention to provide a vehicle body extender wherein said pivotal connections are positioned relatively close to said bumper means.

It is a further object of the present invention to provide a vehicle body extender wherein each said longitudinally extending frame member terminates in an abutting relation with a stop means provided in said bumper means near the connection of said energy absorption means to said bumper means to be in substantial longitudinal alignment therewith.

It is still another object of the present invention to provide a vehicle body extender wherein said axle is a continuous rigid member being transverse to said longitudinally extending frame members and connected to said longitudinally extending frame members by two spring means, one attached to each said frame member.

It is yet another object of the present invention to provide a vehicle body extender wherein a bumper is attached to said frame members of said extender at the rear end thereof to transmit impacts to the rear of said extender through said energy absorption means of said vehicle.

It is still another object of the present invention to provide a vehicle body extender wherein said extender frame is rectangular in cross section.

It is yet an additional object of the present invention to provide a vehicle body extender wherein said spring means is a leaf spring, each attached at one end to said axle, and at their other end to said longitudinally extending frame members.

It is still a further object of the present invention to provide a vehicle body extender wherein said connecting means include a pivotally mounted locking lever carried within each said longitudinally extending frame member, said locking lever being operatively connected by linkage means to an actuating lever pivotally mounted on each said longitudinally extending frame member, for selective movement of said locking lever into and out of a slot provided in said frame member and said vehicle bumper, the former position of said locking lever locking said frame to said bumper, the latter position unlocking said frame from said bumper.

It is yet another object of the present invention to provide a vehicle body extender wherein said stop means includes a vertical plate attached to said vehicle bumper and abutting the end of said longitudinally extending frame members.

It is still another object of the present invention to provide a vehicle body extender wherein said actuating levers are provided with locking means to selectively lock said actuating lever to said longitudinally extending frame member when said pivotally mounted pin is operatively positioned within said slot.

It is still a further of the present invention to provide a vehicle body extender wherein said housing is detachable from said extender frame by detaching means supported by said frame.

It is still another object of the present invention to provide a vehicle body extender wherein said detaching means includes longitudinally extending track member provided on said longitudinally extending frame members which slidably support said housing.

It is still another object of the present invention to provide a vehicle body extender wherein a housing locking means is provided on said housing to lock said housing on said extender frame when said housing is attached to said frame at said track members.

It is yet another object of the present invention to provide a vehicle body extender wherein each said housing are provided with a housing locking means, each said housing being independently slidably detachable from said extender frame to the rear of said extender.

It is still another object of the present invention to provide a vehicle body extender wherein said housings are equal in overall dimensions and internal volume.

It still a further object of the present invention to provide a vehicle body extender wherein there is a longitudinal division between said housing members.

It is yet another object of the present invention to to provide a vehicle body extender wherein there is a transverse division between said housing members.

It is yet an additional object of the present invention to provide a vehicle body extender wherein each housing is provided with a hinged cover and a plurality of contoured handles for sliding and lifting said housing, each cover being provided with cover locking means to lock said cover in its closed position to said housing.

It is yet a further object of the present invention to provide a vehicle body extender wherein weight measuring means is provided on said extender to measure and indicate the amount of weight added to said extender.

It is yet another object of the present invention to provide a vehicle body extender wherein said weight measuring means measures the relative position of said axle with respect to said housing and indicates that position in terms of the amount of weight added to said extender.

It is still another object of the present invention to provide a vehicle body extender wherein said weight measuring means includes an indicator rod attached to said axle to measure the relative position of said axle with respect to said housing.

It is yet a further object of the present invention to provide a vehicle body extender wherein said weight measuring means includes a weight indicator scale on said housing denoting the weight increments added to said extender, said indicator rod having a marking for indicating the specific added weight on said scale.

It is still another object of the present invention to provided a vehicle body extender wherein there is a weight measuring means provided on each side of said extender.

It is yet another object of the present invention to provide a vehicle body extender wherein overweight sensing means is provided on said extender to sense and indicate when the amount of weight added to said extender exceeds a predetermined weight limit.

It is a further object of the present invention to provide, in a towed vehicle, a weight measuring means carried thereby to measure and indicate the amount of weight being carried by said vehicle.

It is another object of the present invention to provide, in a towed vehicle, a overweight sensing means carried thereby to sense and indicate when the amount of weight added to said vehicle exceeds a predetermined weight limit.

It is yet another object of the persent invention to provide a vehicle body extender that can be efficiently, quickly and safely coupled to the towing vehicle.

It is another important object of the present invention to provide a vehicle body extender that will steer with the towing vehicle both in forward and reverse directions.

Other objects of the present invention and details of the structure of the vehicle body extender will appear more fully from the following descriptions and accompanying drawings.

DESCRIPTION OF THE DRAWINGS

The accompanying drawings refered herein and constituting a part hereof, illustrate an embodiment of the invention and, together with description, serve to explain the principles of the invention.

In the drawings.

DESCRIPTION OF THE INVENTION

Refering now to the drawings and in particular to drawings of FIGS. 1 through 5 there is shown a vehicle body extender 10 as contemplated by the present invention.

The vehicle body extender 10 is adapted to be closely coupled to and be towed by a towing vehicle 12 such as an automobile. As will be explained in further detail, the vehicle body extender 10 is rigidly coupled to the towing vehicle 12 by at least two connections to steer with said towing vehicle 12, both in a forward and reverse direction.

Figure 1:
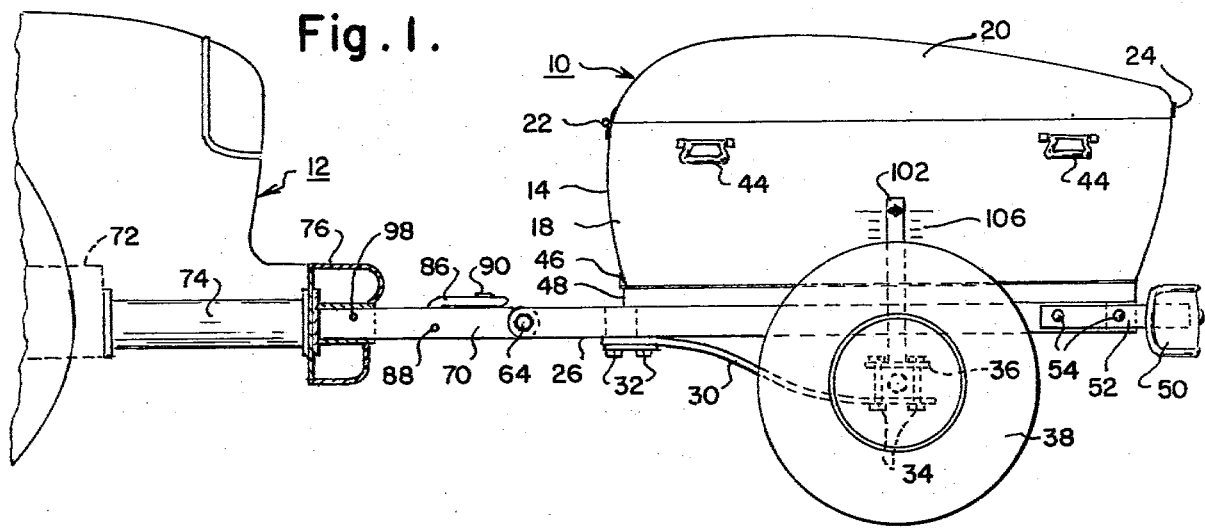
FIG. 1 is a partial sectional view in elevation with certain parts partially cut away showing the vehicle body extender of the present invention along with the rear portion of the towing vehicle.
Figure 2:
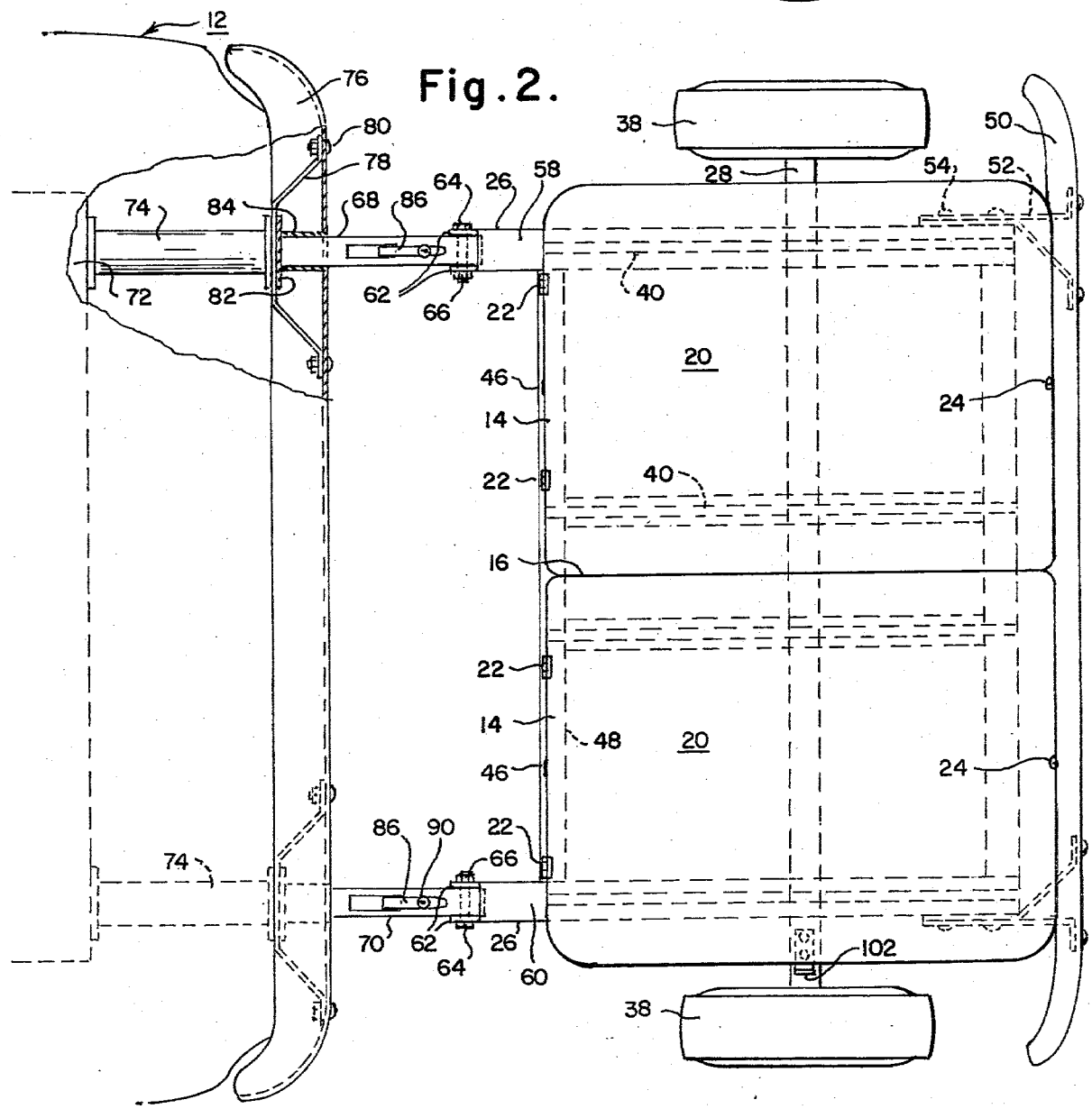
FIG. 2 is a top view of the vehicle body extender of FIG. 1.

The vehicle body extender 10 is provided with at least one housing 14, and, as shown in FIGS. 1 and 2, two housings 14 having a longitudinal division therebetween. Each of the housings 14 are shown as being generally equal in overall dimensions and having the same internal capacity. The housings 14, of course, could have a transverse division therebetween, and one housing could be of different size than the other housing. The housing 14 may be shaped in many varied forms, for example, in the form of bushel baskets, picnic baskets, or could be shaped in a form to carry golf clubs or the like.

The housings 14 are each provided with a carrying portion 18 which, as the name implies, carry and transport the material to be towed. Each carrying portion 18 may be each covered by a cover 20 which may be hingedly or otherwise removably attached to the carrying portion 18. As can be seen in FIGS. 1 and 2, the hinges 22 are provided at the forward end of the housing 14 (toward the towing vehicle 12).

The covers 20 and the carrying portions 18 may be areodynamically designed to reduce the air resistance flowing from the towing vehicle 12 and the design may be a continuation of the body lines of the towing vehicle. The cover 20 may be provided with a lock 24 to secure the cover 20 to its carrying portion 18. An appropriate seal (not shown) may be provided between the cover 20 and the carrying portion 18 to effect a water-tight seal therebetween.

The housing is supported by a frame 26 by means to be described in further detail below. The frame 26 is generally formed in a box fashion of rectangular cross section, having a number of transverse and longitudinal members.

The frame 26 is resiliently attached to an axle 28 by means of a spring 30. The spring 30 which may be a single tapered leaf spring, may be attached to the frame toward the forward end thereof, by suitable fastening means such as bolts 32. The spring 30 may be attached to the axle 28 by suitable fastening means such as bolts 34 which capture the axle 28 between a fastening plate 36 and the spring 30. The spring 30 may be a conventional mult-leaf spring, a coil spring, a stabalizer bar, or any other suitable resilient spring means for the axle 28.

The axle 28 which may be a continuous rigid member has tires 38 rotatably mounted at each of its ends. The axle may also be equipped with suitable braking means (not shown) which may be operatively integrated with the brakes of the towing vehicle 12 such that they are actuated simultaneously therewith. Further, suitable brake, directional and running lights (all not shown) may also be operatively integrated with the same systems provided on the towing vehicle 12, to operate simultaneously therewith.

Figure 5:
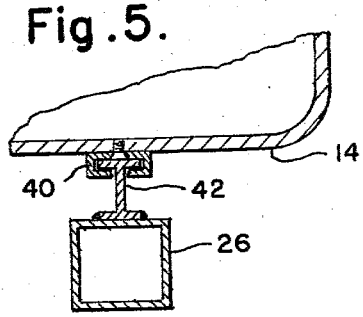
FIG. 5 is an enlarged sectional view of the track upon which the housing members of the vehicle body extender of FIG. 1 may be slidably mounted.

The frame 26, as before mentioned, is provided with a number of longitudinal and transverse members which support the housing 14. The housing 14 may be slidably removed from the frame 26 by suitable slide means which, as can be seen in FIG. 5, may include longitudinally extending tracks 40 fastened to the frame 26 by suitable fastening means, such as bolts or screws or the like (not shown). The tracks 40 may be substantially "C" shaped to accept a substantially "T" shaped member 42, attached to the housing 14. This arrangement allows for the slidable movement of the housing 14 on the frame 26 for the removal of the former from the latter. To further facilitate this slidable movement, handles 44 may be provided on the housing 14 to slide, lift, and pull the housing 14.

A housing lock 46 may be provided in the housing 14 to lock it to the frame 26. The housing lock 46 may be so positioned in the forward part of the housing 14 to lock it to a transverse member 48 of the frame 26, there being one such lock 46 for each housing 14.

The vehicle body extender 10 is further provided with a bumper 50 which is suitably attached to the frame 26 by a bumper bracket 52. The bumper bracket 52 is fastened to the frame 26 and the bumper 50 by suitable fastening means such as bolts 54 and 56 respectively.

The bumper 50, the bumper bracket 52 and the frame 26 are in longitudinal alignment so that the energy of any rear impact to the bumper 50 will be transferred to and through the longitudinally extending members 58 and 60. This important feature of the vehicle body extender 10 will be explained in further detail below.

The longitudinally extending members 58 and 60 each forwardly terminate in and define a pivot point for the vehicle body extender 10. More particularly, each member 58 and 60 are provided at their forward ends with apertured ears 62 for receiving a pivot pin 64 having a nut 66 threadably secured thereto. Each pivot pin 64 pivotally captures longitudinally extending frame members or extentions 68 and 70; each such extention 68 and 70 having apertures 71 in alignment with the apertures in the ears 62 all for receiving the pivot pins 64 therethrough. This arrangement facilitates relative vertical movement of the extensions 68 and 70 with members 58 and 60 and therefore with the entire vehicle body extender 10 with the towing vehicle 12. That is, the entire vehicle body extender can pivot about the pivot pin 64 and thus with respect to the towing vehicle 12.

The towing vehicle 12 is provided with a frame 72 which rearwardly (toward the rear of the towing vehicle 12) terminates in an energy absorption device 74. These energy absorption devices 74 may be of the type mandated by the U.S. Department of Transportation to absorb impacts to the towing vehicle bumper 76 to which the energy absorption devices 74 are attached. More particularly, the bumper 76 may be connected to a bumper bracket 78 by fastening means such as bolts 80. The bumper bracket may in turn be secured to the energy absorption devices 74 by means of fastening plate 82 which may be welded or otherwise secured to the bracket 78. The fastening plate is provided with a hollow extension 84 which is open at the rearward end to receive the frame extensions 68 and 70 of the vehicle body extender 10. Typically, the frame extensions 68 and 70 as well as the frame 26 of the vehicle body extender 10 will be rectangular in cross section and, similarly, the hollow extension 84 will be rectangular is cross section to receive extensions 68 and 70.

Figure 3:
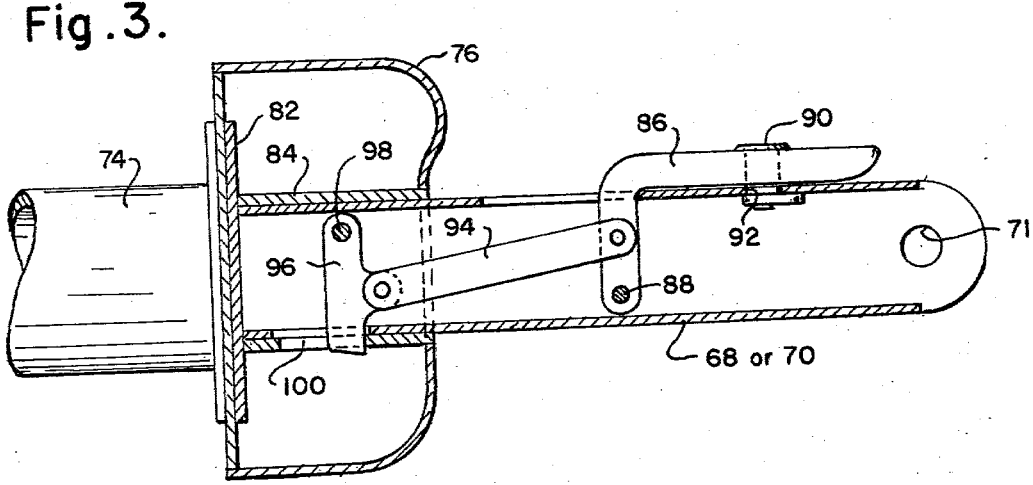
FIG. 3 is an enlarged sectional view in elevation, showing coupling mechanism coupling the vehicle body extender to the towing vehicle, said coupling being shown in its locked position.
Figure 4:
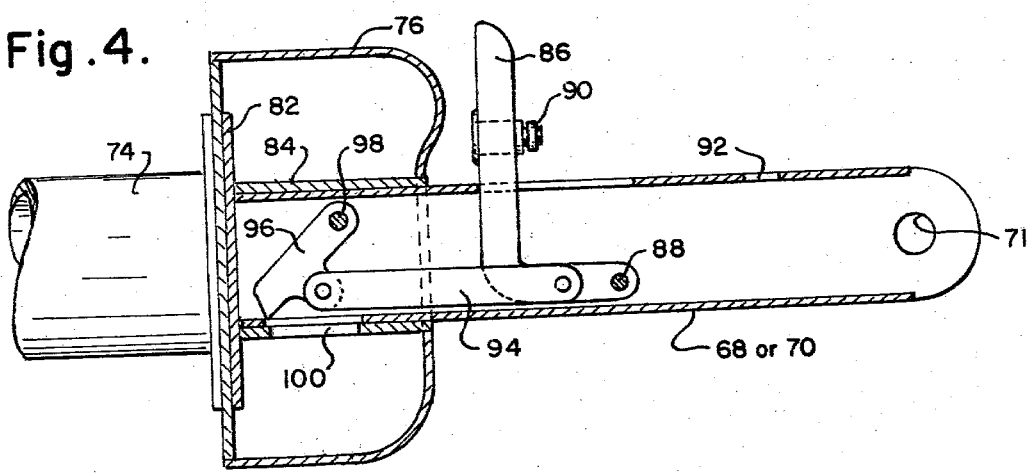
FIG. 4 is coupling mechanism of FIG. 3 in its unlocked position.

As can best be seen in FIGS. 3 and 4, the vehicle body extender 10 is mechanically coupled to the towing vehicle 12 at the mating ends of extensions 68 and 70, and the hollow extension 84. More particularly, each frame extension may be provided with an internal locking mechanism comprising a manually operated pivotal lever 86, which pivots about pin 88. The lever 86 is provided with a suitable lock 90 which may be of the key actuated rotary type to lockably engage the extensions 68 or 70 at an opening 92 provided therethrough. The lever 86 is linkably connected by a link 94 to a locking lever 96 which pivots about pin 98. The locking lever 96 is pivotaly driven into and out of a longitudinally extending slot 100 provided in the frame extensions 68 and 70 and the hollow extension 84. In FIG. 3 the lever 86 is shown is its locked position with the lock 90 lockably inserted within the opening 92. In this position the locking lever 96 has been driven in to the slot 100 to engage the forward end thereof to restrict any rearward motion of the extensions 68 and 70. The forward motion of the extension is restricted by the abuttment of the forward end of the extensions, against the plate 82.

Accordingly, the extensions 68 and 70 and thereby, the entire vehicle body extender 10 are securely coupled to the hollow extension and thereby, to the towing vehicle 12. FIG. 4 illustrates the unlocking of the extensions 68 and 70 from the hollow extension 84 by the moving of the lever pivotally forward thereby driving the locking lever 96 out of the slot 100. At this point, the extensions 68 and 70 may be freely withdrawn from the hollow extensions 84 to thereby uncouple the vehicle body extender 10 from the towing vehicle. It should be pointed out that this arrangement permits the close coupling of the vehicle body extender 10 to the towing vehicle 12 and there may be only 12 to 13 inches between the rearward end of the bumper 76 and the housing 14. The opened ends of the hollow extension 84 may be suitably covered when the extensions 68 and 70 are withdrawn therefrom by a cap (not shown) or the like.

The vehicle body extender 10 thus provided is a highly efficient way of enlarging the luggage capacity of the towing vehicle 12 without any significant loss of eceonomy or steerabilty of the towing vehicle. To insure that certain luggage limits are not exceeded, which might adversely effect that steerability, the vehicle body extender is provided with a weight measuring means which might include an indicator rod 102 which is attached to the axle 28 by suitable fastening means such as bolts 104 or the like. The indicator rod 102 will ride with the axle, and accordingly will measure the movement of the axle with respect to the frame 26 and/or the housing 14. A scale 106 may be provided on the housing to denote the weight increments being added to the vehicle body extender 10. More particularly when luggage is placed into the housing 14, the added weight will tend to deflect the springs 30 and the housing 14 will tend to move downwardly towards the axle 28 as more and more weight is added. The indicator rod 102 and the scale 106 may be provided on each side of the vehicle body extender 10 to denote not only the total weight but any transverse unbalance of the weight in the housing 14. Both values will be important to the vehicle operator to insure that the towing vehicle 12-body extender 10 combination will perform properly when confronted with various road conditions.

Figure 6:
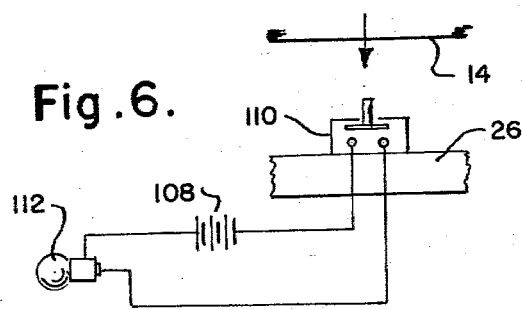
FIG. 6 is a weight alarm circuit that may be used in connection with the vehicle body extender of FIG. 1.

In addition to weight increments, the scale may also denote the maximum allaowable weight that mey be carried by the vehicle body extender. This maximum scale reading could be used in connection with an alarm system that could energize a light, buzzer, or bell within the towing vehicle. For example, FIG. 6 shows a signaling system using the towing vehicle 12 battery 108 which could be electrically connected to a switch 110 that could be closed by the indicator rod 102 when it has reached a certain displacement with respect to the scale 106. A strain gage could also be applied to the spring 30 to measure a change in its properties as it relates to weight added to the housing 14. These weight related signals could be used to close the switch 110 to energize the alarm 112. The alarm 112 as before mentioned could be provided in the towing vehicle 12, possibly a buzzer at a dashboard location. The alarm 112 could also be provided at the housing 14 area to immediately provide an overweight alarm while the luggage was being loaded within the housing 14.

Another important function of the vehicle body extender 10 which has been previously alluded to breifly is the transfer of rear impact energy from extender bumper 50 through the longitudinally extending members 58 and 60 to be ultimatley absorbed by the energy absorption devices 74. As can be seen in FIGS. 1 and 2 the extender bumper 50 is in longitudinal alignment with the members 58 and 60 and with the towed vehicle bumper 76 and the hollow extensions 84 which terminate in the energy absorption devices 74. This alignment of the abovementioned structural parts insures that the extender bumper 50 will act generally the same as the towing vehicle bumper 76 in terms of absorbing rear impact energy.

It can be seen from the above description that the vehicle body extender 10 as contemplated by the present invention is much more than a trailer; it is truly an extension of the body of the towing vehicle. The driver will be only slightly aware of any changes in the performance of his automobile when the extender is attached or unattached. The styling of the vhicle body extender 10 can be closely coordinated with the style of the automobile in terms of color, design of the housing, the provision of fender panals and the like. The vehicle body extender 10 and its verious parts can be manufactured from a wide range of materials already used in the auto industry. For example, the housing could be molded plastic of the type used to make automobile body panels.

Accordingly, it will be understood that the above description of the present invention is susceptible to various modifications, changes and adaptions, and the same are intended to be comprehended within the meaning and range of equivalents of the appended claims.

What is claimed is:

1. A vehicle body extender for attachment to a vehicle comprising a frame, at least one housing supported by said frame, said frame resiliently attached to an axle by spring means, wheels rotatably mounted at each end of said axle, said frame comprising at least two frame members longitudinally extending and oriented toward the vehicle to which said extender is to be coupled, connecting means to rigidly connect said longitudinally extending frame members to said vehicle, said longitudinally extending frame members are each provided with a pivotal connecting means to permit said extender and said vehicle to move vertically with respect to one another, said vehicle having a frame and being provided with a rear bumper means attached to said frame of said vehicle by energy absorption means, said bumper means receiving each said frame members for rigid attachment thereto, said bumper means includes a recess to receive each of said frame members and each said longitudinally extending frame member terminates in said recess in an abutting relation with a stop means provided at the inward end of said recess and near where said energy absorption means connects to said bumper means to be in substantial longitudinal alignment.

2. A vehicle body extender in accordance with claim 1 wherein said axle is a continuous rigid member being transverse to said longitudinally extending frame members and connected to said longitudinally extending frame members by two spring means, one attached to each said frame member.

3. A vehicle body extender in accordance to claim 1 wherein a bumper is attached to said frame members of said extender at the rear end thereof to transmit impacts to the rear of said extender through said extender frame members to said energy absorption means of said vehicle.

4. A vehicle body extender in accordance with claim 1 wherein said spring means is a leaf spring each attached at one end to said axle and at their other end to said longitudinally extending frame members.

5. A vheicle body extender in accordance with claim 1 wherein said connecting means includes a pivotally mounted locking lever carried within each said longitudinally extending frame member, said locking lever being operatively connected by linkage means to an actuating lever pivotally mounted on each said longitudinally extending frame member for selective movement of said locking lever into and out of a slot provided in said frame member and said vehicle bumper, the former position of said locking lever locking said frame to said bumper, the latter position unlocking said frame from said bumper.

6. A vehicle body extender in accordance with claim 1 wherein said stop means includes a vertical plate attached to said vehicle bumper and abutting the end of said longitudinally extending frame members.

7. A vehicle body extender in accordance with claim 5 wherein said actuating levers are provided with locking means to selectively lock said actuating lever to said longitudinally extending frame members when said pivotally mounted locking lever is operatively positioned within said slot.

* * * * *